(12) United States Patent
Kayser

(10) Patent No.: US 6,515,430 B2
(45) Date of Patent: Feb. 4, 2003

(54) POWER SUPPLY FOR LAMPS

(75) Inventor: Roy Kayser, Etobicoke (CA)

(73) Assignee: EXFO Photonic Solutions Inc., Mississauga (CA)

( * ) Notice: Subject to any disclaimer, the term of this patent is extended or adjusted under 35 U.S.C. 154(b) by 0 days.

(21) Appl. No.: 09/774,573

(22) Filed: Feb. 1, 2001

(65) Prior Publication Data

US 2002/0135317 A1 Sep. 26, 2002

(51) Int. Cl.[7] ............................................. H05B 37/02
(52) U.S. Cl. .................... 315/224; 315/291; 315/307; 363/15; 363/25; 363/74
(58) Field of Search ........................... 315/209 R, 291, 315/307, 224, 362, 326, 82; 363/15, 19, 21, 23, 25, 26, 74

(56) References Cited

U.S. PATENT DOCUMENTS

| | | | | |
|---|---|---|---|---|
| 5,428,267 A | * | 6/1995 | Peil | ............................ 315/224 |
| 5,463,287 A | * | 10/1995 | Kurihara et al. | ...... 315/209 CD |
| 5,559,395 A | * | 9/1996 | Venkitasubrahmanian et al. | ........................ 315/209 R |
| 6,215,252 B1 | * | 4/2001 | Stanton | ........................ 315/224 |
| 6,281,641 B1 | * | 8/2001 | Chen et al. | ................... 315/127 |

OTHER PUBLICATIONS

Lesco, Lightwave Energy Systems Co., Inc., Super Spot Max Operation Manual, pp. 1–26, Jul. 6, 2000.

* cited by examiner

Primary Examiner—Haissa Philogene
(74) Attorney, Agent, or Firm—Bereskin & Parr

(57) ABSTRACT

The invention relates to a power supply for an illumination system used to expose photo-initiated adhesives. The illumination system includes an arc lamp to provide light. As the lamp ages, its electrodes deteriorate, reducing the amount of light directed into a light guide and ultimately onto the adhesive. The power supply provides an increasing power input to the lamp to increase the light output of the lamp, countering this deterioration at least in part. The voltage and current drawn by the lamp are measured and a skewed control signal which magnifies the level is used to control the power input to the lamp.

33 Claims, 5 Drawing Sheets

POWER SUPPLY FOR LAMPS

FIELD OF THE INVENTION

This invention relates to power supplies for certain lamps. More particularly, the invention may be used to prolong the useful life of lamps that exhibit a progressive degradation in light energy output in response to the application of electrical power, such as arc lamps.

BACKGROUND OF THE INVENTION

A photo-initiated adhesive is responsive to light energy when in liquid form to begin setting into a solid form. The photo-initiated adhesive must be exposed to a predetermined amount of light energy in order for the setting process to begin. Light energy of various wavelengths may be used, depending on the particular photo-initiated adhesive. In many cases, arc lamps are used to provide the required light energy.

A known problem with arc lamps is that they exhibit a progressive degradation in their light energy output during their useful service lives. An arc lamp typically has a sealed region containing a gas which may be under pressure and a pair of electrodes separated by a gap. The gas may comprise mercury, argon, zenon and other gases. A voltage potential is applied across the electrodes by a power supply, causing an arc to be generated in the gap. The arc causes the gas in the gap and the region adjacent to the gap to form a plasma, which emits light. The wavelength of the emitted light depends on the gas used.

The lamp usually has a reflector which focuses most of the emitted light into a light delivery device, such as a fiber optic light guide. The light delivery device is used to direct the light onto the photo-initiated adhesive. The reflector may be said to provide an optical coupling between the lamp and the light delivery device. The optical coupling is configured to direct a known amount of light into the light delivery device, when the lamp is in new condition.

Over time, the electrodes in the lamp deteriorate in response to the electrical power applied across them. Typically, the rate of this deterioration is higher when a larger power signal is applied to the lamp. As the electrodes deteriorate, the gap between them becomes larger. The larger gap length increases the impedance of the lamp, resulting in the lamp drawing less current from the power supply. Also, the larger gap length requires a larger voltage potential across the electrodes to maintain the arc. As the current drawn by the lamp falls, the power consumed by the lamp also falls. The degradation of the electrodes and the corresponding drop in power drawn by the lamp would normally reduce the light emitted by the lamp.

To prevent the light output of the lamp from falling, the lamp's power supply is typically configured to apply a constant amount of power by increasing the voltage applied to the lamp during the lifetime of the lamp, as the current drawn by the lamp falls. The constant power input results in a relatively constant light output from the lamp.

The larger gap length also results in a longer arc and a correspondingly larger physical volume of plasma from which light energy is emitted. As the volume of plasma increases and more generally, as the shape of that volume changes, the optical coupling between the lamp and the light delivery device may become less efficient, resulting in less light being directed into the light delivery device, despite the fact that the light output from the lamp remains relatively constant. The reduced amount of light being coupled into the light delivery device directly reduces the amount of light energy that may be used to expose a photo-initiated adhesive.

The life of the electrodes may be extended by applying a smaller power signal across them. However, this solution has the disadvantage that the lamp will emit less light. Furthermore, the electrodes will still deteriorate, (although at a slower rate) and accordingly, the light coupled into and emitted from the light delivery device will still decline during the life of the lamp.

The effect of reduced light being coupled into the light delivery device during the service life of the lamp may be partially compensated for by increasing the power applied to the lamp during its life, rather than keeping the power level constant. As the lamp ages, the increased power input results in an increased light output from the lamp. The increased light output may compensate (at least in part) for the degraded optical coupling between the lamp and the light delivery device by slowing the absolute reduction in light energy focused into the light delivery device.

One power supply that implements this solution provides a power output adjustment for manually adjusting the power level applied to the lamp. In this system, a user initially sets the power level to a fraction of the rated power level of the lamp. Then as the lamp ages, the user periodically increases the power level applied to the lamp. Eventually, the lamp burns out or is replaced for another reason. The user must then reset the power level to the initial level for the new lamp. This manual system has several disadvantages. First, a user may forget or neglect to periodically increase the power applied to the lamp resulting in a low light output level from the lamp. Second, if the user has adjusted the power signal to a high level during the life of one lamp and then does not return it to its proper initial level when a new lamp is installed, the new lamp will deteriorate more rapidly. Third, a user will normally have no way of knowing what power level should be set for a previously used lamp which is being re-installed, unless the user recorded the setting when the lamp was removed. Fourth, the user may intentionally set the power signal to its highest level in order to increase the light output of the lamp. This will defeat the purpose of the adjustment and result in the lamp having a short useful service life. In combination, these disadvantages are likely to lead to the adjustment being ignored or used incorrectly.

Accordingly, there is a need for an improved power supply for use with lamps that exhibit a change in the size and shape of the arc resulting in a change in their light energy output in response to the application of a power signal. Preferably, the new power supply will automatically adjust the power supplied to the lamp. When used with an arc lamp, the improved power supply will preferably reduce the rate of deterioration of the electrodes of lamp, thereby reducing the rate at which the light energy output of the lamp degrades, as well as reducing the effects of light coupling degradation.

SUMMARY OF THE INVENTION

The present invention provides a power supply for a lamp which exhibits an erosion of its electrodes or of another component of the lamp in response to the application of an electrical potential to the lamp, resulting in a change in the power drawn by the lamp from the power supply. The power supply provides an output power signal with a current and a voltage component to the lamp. As the electrodes of the lamp deteriorate, the lamp's resistance falls and it draws less current from the power supply. This fall in the current component of the output power supply is measured and is used to generate a skewing signal. The voltage across the lamp is controlled by the power supply and it is also measured. A control signal is generated based on the measured voltage and current components of the output power signal applied to the lamp. A feedback loop is used to regulate this control signal by increasing the magnitude of the voltage component of output power signal to (i) compensate for the fall in the current component of the output power signal and (ii) in response to the skewing signal, which amplifies the effect of the fall in the current component. The voltage component of the output power signal is thus increased more than is required to keep the power magnitude of the output power signal constant in response to the fall in its current component. The power magnitude thus rises in response to the fall in the current component, which is correlated to the deterioration of the lamps electrodes and the related change in the size and shape of the lamp's light output.

The power supply of the present invention is configured to initially power the lamp at a portion of its rated power level. Typically, this portion will be between 50% and 90% of the rated power level. The portion may be less than 50%, although this may cause an undesirable loss in light output from the lamp. More preferably, the portion is between 70% and 85% of the rated power of the lamp. During the life of the lamp, the power signal is steadily increased in response to the reduction in current drawn by the lamp. Towards the end of the service life of the lamp, the power signal applied to the lamp may be close to the rated power of the lamp.

BRIEF DESCRIPTION OF THE DRAWINGS

A preferred embodiment of the present invention will now be described in detail with reference to the drawings, in which.

DETAILED DESCRIPTION OF THE PREFERRED EMBODIMENT

Figure 1:
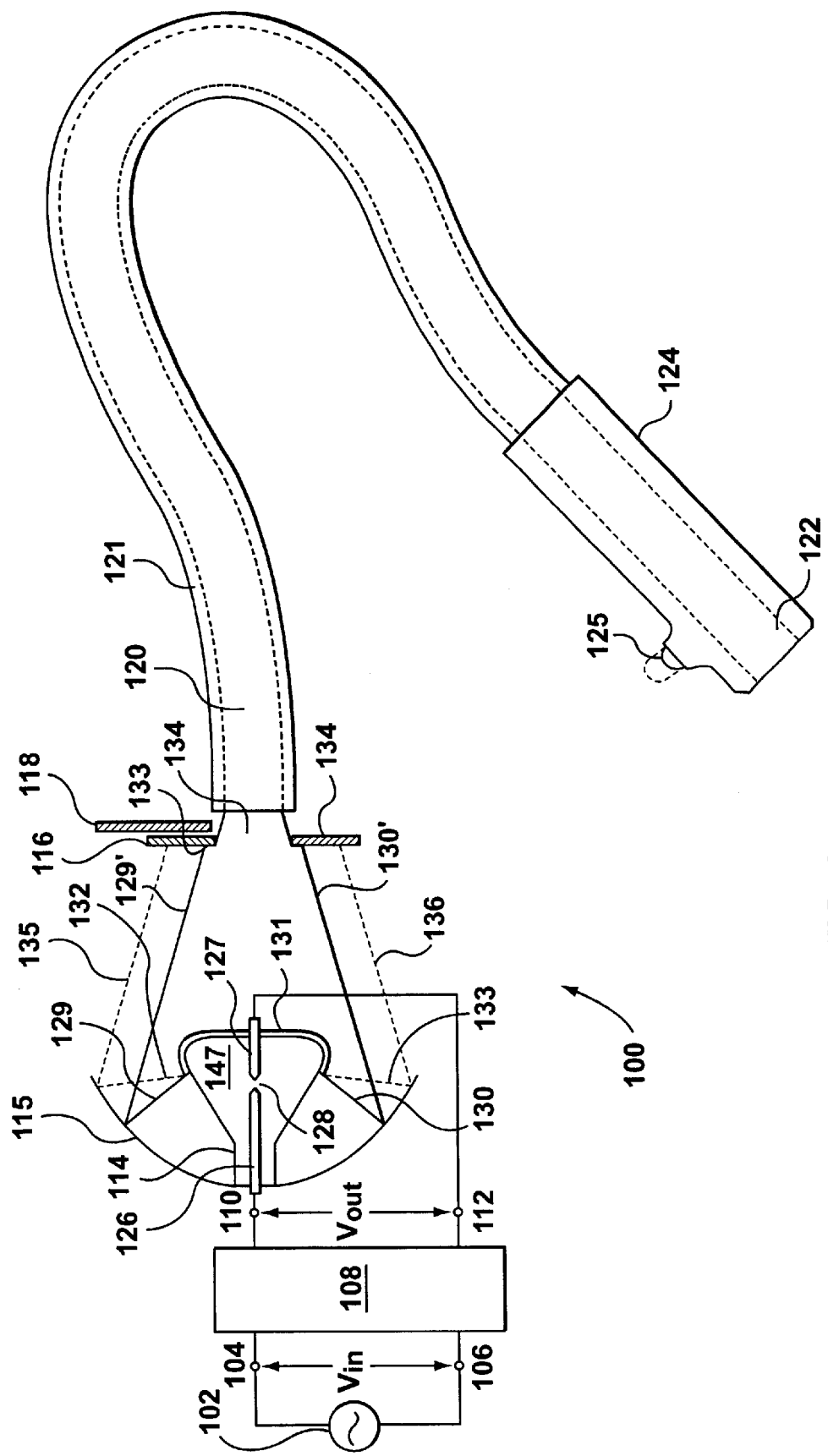
FIG. 1 illustrates a typical prior art illumination system for exposing photo-initiated adhesives with light energy.

Reference is first made to FIG. 1, which illustrates a prior art illumination system 100 used to expose photo-initiated adhesives to light energy. System 100 has a power source 102, pair of power input terminals 104, 106, a power supply 108, a pair of power output terminals 110, 112, a lamp 114, a reflector 115, a diaphragm 116, a shutter 118, a light delivery device 120, and a handle 124.

A power source 102 is coupled to power input terminals 104, 106. Power source 102 provides an alternating current power signal $V_{in}$ across terminals 104 and 106. Power signal $V_{in}$ may be a typical municipal AC power supply and power source 102 may be operated by a typical municipal electric company.

Power supply 108 receives power signal $V_{in}$ and provides a DC output power signal $V_{out}$ at terminals 110, 112, to which lamp 114 is coupled. Lamp 114 emits light in response to power signal $V_{out}$.

Light delivery device 120 may be a light guide such as an optic fiber, a bundle of optic fibers or another other light transmitting element. Typically, light delivery device 120 will have a protective cover 121, which may be made of plastic, rubber, metal or another material. Typically, light delivery device 120 will be 4–5 mm in diameter, although this dimension may vary substantially depending on the particular application of illumination system 100.

Reflector 115 is positioned adjacent to lamp 114 to reflect the emitted light into light delivery device 120 through diaphragm 116. Diaphragm 116 has an opening sized to permit a round spot of light to fall on light delivery device 120. The light incident on light delivery device 120 is transmitted to the illuminating end 122 of the light delivery device 120, which is within and extends through handle 124. Light incident on light delivery device 120 from reflector 115 is emitted from the illuminating end 122.

Handle 124 has an illumination control button 125, which is coupled to shutter 118 by a control circuit (not shown). The control circuit operates to open shutter 118 when button 125 is depressed (as shown in solid outline in FIG. 1) and to close shutter 118 when button 125 in its normal extended position (as shown in dotted outline in FIG. 1). When shutter 118 is closed, light from lamp 114 is blocked from entering light delivery device 120 and the illuminating end 122 of light delivery device 120 does not emit any light. When shutter 118 is open, the illuminating end 122 of light delivery device 120 emits light from lamp 114. Button 125 allows the operator of system 100 to open and close shutter 118 to control the amount of light emitted from the illuminating end 122 of light delivery device 120. Button 125 may be located in another position on illumination system 100. For example, it may be located on the housing of a part of the illumination system which contain lamp 114 and power supply 108. Button 125 is shown as part of handle 124 as an example only.

An operator uses system 100 by placing a photo-initiated adhesive (not shown) in a liquid form on a selected location (not shown), using handle 124 to point illumination end 122 of light delivery device 120 at the photo-initiated adhesive, depressing button 125 to begin exposing the photo-initiated adhesive to light from lamp 114, waiting for a predetermined amount of time, which has been selected to start to photo-initiated adhesive to set into a solid form and releasing button 125 to stop exposing the photo-initiated adhesive, which then completes the curing process.

Referring still to FIG. 1, lamp 114 has a sealed region 147 which contains a gas such as xenon, argon, mercury, neon or another gas which emits light energy in response to an electrical potential. A pair of electrodes 126, 127, which are coupled to power output terminals 110, 112, extend into the sealed region and have a gap 128 between them. When power signal $V_{out}$ is applied to electrodes 126, 127, the gas in sealed region 147 forms a plasma and begins to emit light. The majority of this emitted light is directed onto reflector 115 between lines 129 and 130. Lamp 114 may have a mirrored surface 131 to ensure that a majority of the the light emitted by lamp 114 remains within lines 129 and 130. This light is then directed by reflector 115 as a light spot 133 onto diaphragm 116, as indicated by lines 129' and 130'. Preferably, light spot 133 is about the same size as the opening 134 in diaphragm 116 (i.e. it is only slightly smaller or larger than opening 134) and most of the reflected light passes through opening 134 onto light delivery device 120.

Over time, electrodes 126, 127 will erode in response to the power signal $V_{out}$ applied to them. As they erode, the gap 128 between them will grow. As a result, the limits of the same relative quantity of light energy which was initially emitted by lamp 114 between lines 129, 130 may now be emitted between dotted lines 132, 133. Reflector 115 will now reflect the emitted light onto a larger spot 134 on diaphragm 116, as indicated by dotted lines 135, 136. As a result, a smaller proportion of the light emitted by lamp 114, and a smaller absolute amount of light energy, is directed into light delivery device 120. This degradation in the optical coupling between lamp 114 and light delivery device 120 results in less light being available at the illumination end 122 of light delivery device 120 to expose a photo-intiated adhesive, increasing the length of exposure required to start the photo-initiated adhesive to set.

The increased gap 128 between electrodes 126, 127 also changes the load characteristics of lamp 114. The impedance between the electrodes increases, causing the current drawn by lamp 114 from power supply 108 to fall. Power supply 108 is configured to maintain a constant level of power to lamp 114 by increasing the voltage component of power signal $V_{out}$. This is described in greater detail below. The constant power input into lamp 114 results in lamp 114 emitting a relatively constant amount of light, however, the degraded optical coupling still results in less light being directed into light delivery device 120.

Figure 2:
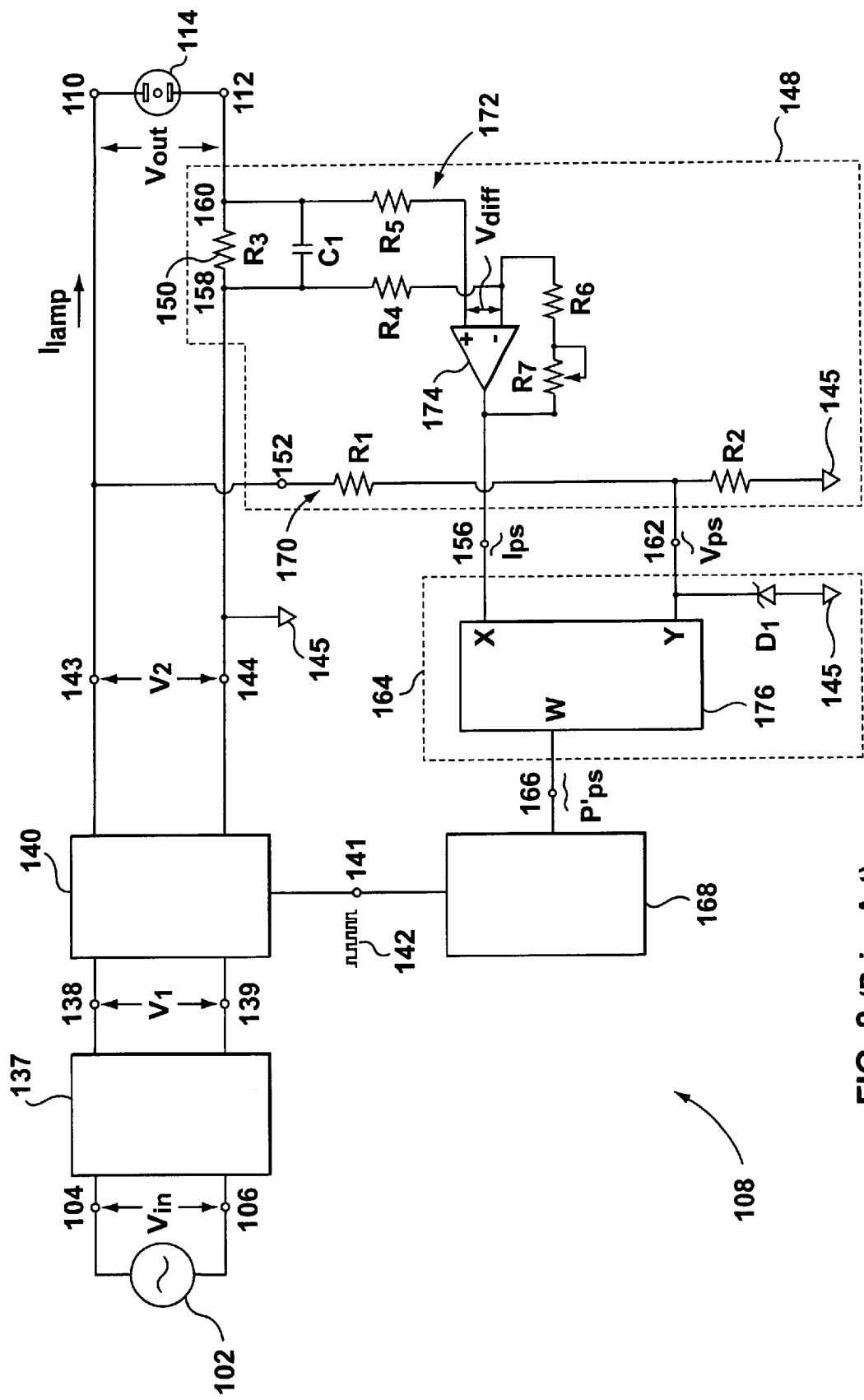
FIG. 2 is a block/schematic diagram of a prior art power supply of the system of FIG. 1.

Reference is next made to FIG. 2, which illustrates prior art power supply 108 in block diagram format. Power supply 108 includes an off-line power stage 137, a DC—DC power stage 140, an output power monitoring stage 148, an output power calculating stage 164 and an output voltage control stage 168.

Off-line power stage 137 is coupled to terminals 104 and 106 to receive input power signal $V_{in}$. DC—DC power stage 140 may be configured to filter switching transients, EMI and other forms of noise from input power signal $V_{in}$. Off-line power stage 137 provides a "clean" DC power signal $V_1$ corresponding to input power signal $V_{in}$ at terminals 138 and 139.

DC—DC power stage 140 is coupled to terminals 138 and 139 to receive power signal $V_1$ and is also coupled to an output power control terminal 141 from which it receives an output power control signal 142. DC—DC power stage 140 produces a power signal $V_2$ corresponding to output power control signal 142 at terminals 143 and 144. Typically, power signal $V_2$ will be a DC signal, which is suitable for powering lamp 114.

The construction of off-line power stage 137 and DC—DC power stage 140 will be understood by those skilled in the art and they are not described here in detail. Either of off-line power stage 137 or DC—DC power stage 140 may be configured to rectify the power signal ($V_{in}$ or $V_1$) received by that element so that power signal $V_2$ will be a DC rectified signal with a magnitude smaller than that of power signal $V_{in}$. Output power control signal 142 may operate DC—DC power stage 140 as a constant current, constant voltage or constant power supply. The constant current and constant voltage modes are required during the turn-on and warm-up phases of an arc lamp. For the purposes of the present example, output power control signal 142 regulates DC—DC power stage 140 as a constant power supply.

Terminal 143 is coupled directly to a first power output terminal 110. Power output terminal 144 is coupled to a second power output terminal 112 through a current sensing element 150, which is part of output power monitoring stage 148. Typically, current sensing element 150 will be a resistor with a relatively small resistance (for example, less than 1 ohm or less than 0.01 ohm), and therefore will have a relatively small voltage drop across it. Current sensing element 150 may also be another device such as a Hall effect current sensor. As a result of the small voltage drop across sensing element 150, an output power signal $V_{out}$ with a magnitude close to that of power signal $V_2$ will exist across output terminals 110 and 112. Lamp 114 is coupled to terminals 110 and 112 to receive output power signal $V_{out}$.

Terminal 144 is coupled to a reference point 145, which has a reference voltage level. Typically, reference point 145 will have the same potential as point 139, although this is not necessary. Signals produced by output voltage monitoring stage 148 are referenced to this reference voltage. Reference point 145 may be an internal ground point for power supply 108 and may have a reference voltage of 0 volts, although this is not necessary.

Output power monitoring stage 148 is coupled to terminals 143, 144 and 112 to monitor the voltage and current components of power signal $V_{out}$.

Terminal 143 is coupled to a voltage monitoring terminal 152 of output power monitoring stage 148. Terminals 144 and 112 are coupled respectively to a first current monitoring terminal 158 and a second current monitoring terminal 160 of output power monitoring stage 148.

Output power monitoring stage 148 has a voltage monitoring circuit 170 which comprises a pair of resistors $R_1$ and $R_2$. Resistors $R_1$ and $R_2$ are coupled in series between terminal 152 and reference point 145 forming a voltage divider and provide signal $V_{ps}$ at a terminal 162. Signal $V_{ps}$ is referenced to the reference voltage of reference point 145 and has a magnitude that is a fraction of the magnitude of the voltage component of power signal $V_2$, which in turn has a magnitude almost identical to the magnitude of output power signal $V_{out}$.

Output power monitoring stage 148 also has a current monitoring circuit 172 which comprises current sensing element 150, resistors $R_4$, $R_5$, $R_6$ and $R_7$, a capacitor $C_1$ and a differential amplifier 174. In this exemplary embodiment, current sensing element 150 is a resistor $R_3$ coupled between current monitoring terminals 158 and 160. Resistor $R_4$ is coupled between terminal 158 and the negative input terminal of differential amplifier 174. Resistor $R_5$ is coupled between terminal 160 and the positive input terminal of differential amplifier 174. Resistors $R_4$ and $R_5$ act as input resistors for differential amplifier 174 and present a voltage signal $V_{diff}$ across the positive and negative inputs of differential amplifier 174. $V_{diff}$ corresponds to the voltage difference between terminals 144 and 112, which in turn is proportional to the current $I_{lamp}$ in lamp 114. Capacitor $C_1$ is coupled in parallel with resistor $R_3$ and operates to decouple high frequency noise which may be present across terminals 158 and 160 from the inputs of amplifier 174. Resistors $R_6$ and $R_7$ are coupled between the output of differential amplifier 174 and its negative input terminal to provide a negative feedback loop. Resistor $R_7$ is a variable resistor with relatively small resistance and may be adjusted to control the resistance in the feedback loop, thereby allowing the amplification of differential amplifier 174 to be controlled.

Differential amplifier 174 is a linear amplifier and produces signal $I_{ps}$ at terminal 156. Signal $I_{ps}$ is proportional to the current $I_{lamp}$ flowing in lamp 114.

Output power monitoring stage 148 thus provides signal $V_{ps}$ and $I_{ps}$ which correspond to the voltage and current components of the output power signal $V_{out}$ supplied to lamp 114. In this exemplary embodiment of the present invention, the components of output power monitoring stage 148 are selected so that signals $V_{ps}$ and $I_{ps}$ are between 0 to 10 volts.

Output power calculating stage 164 comprises an analog multiplier 176 and a zener diode $D_1$. Multiplier 176 has a pair of inputs X and Y and an output W which is calculated as follows:

$$W = \frac{X \times Y}{10}.$$

Output power calculating stage 164 is coupled to terminals 156 and 162 to receive signals $V_{ps}$ and $I_{ps}$. Output power calculating stage 164 produces a signal $P_{ps}$ at a terminal 166. Signal $P_{ps}$ is equal to:

$$P_{ps} = \frac{V_{ps} \times I_{ps}}{10}$$

Terminal 156 is coupled to the X input of multiplier 176 and terminal 162 is coupled to the Y input of multiplier 176. The W output of multiplier 176 is coupled to terminal 166 and forms signal $P_{ps}$. Since signal $V_{ps}$ at terminal 162 is proportional to the voltage across lamp 114 and since signal $I_{ps}$ at terminal 156 is proportional to the current flowing through lamp 114, the signal $P_{ps}$ is proportional to the power supplied to lamp 114. Zener diode $D_1$ is coupled between terminal 162 and ground in order to protect the Y input of multiplier 176. Resistors $R_1$ and $R_2$ are generally selected so that the magnitude of signal $V_{ps}$ does not exceed the maximum safe level of the Y input. However, this could occur if the magnitude power output signal $V_{out}$ exceeds a particular level. Zener diode $D_1$ limits the maximum voltage at the Y input of multiplier 176 to a safe level.

Output power control stage 168 receives output power signal $P_{ps}$ and provides a pulse width modulated (PWM) output power control signal 142 in response. Output power control stage 168 is a PWM signal generation circuit, which may be of known construction. Output power control stage 168 is configured to vary output power control signal 142 in order to keep signal $P_{ps}$ constant (i.e. such that lamp 114 draws a constant amount of power from power supply 20).

DC—DC power stage 140 is responsive to PWM output power control signal 142 to vary the voltage component of power signal $V_2$, thereby varying the voltage component of output power signal $V_{out}$.

Prior art power supply 108 is configured to produce a constant power output at output terminals 110 and 112, so that lamp 114 receives a constant amount of power from output power signal $V_{out}$. Output power monitoring stage 148, output power calculating stage 164 and output power control stage 168 form a closed feedback loop which monitors and controls the output voltage $V_{out}$ produced by DC—DC power stage 140. Output power control stage 168 varies output power control signal 142 so that output power signal $P_{ps}$ remains constant.

Output power control stage 168 has a conventional design, and a person skilled in the art will be capable of producing it. Accordingly, the structure of output power control stage 168 has not been shown or described in detail.

As lamp 114 ages, the current and voltage components of output power signal $V_{out}$ will change. For example, if an exemplary lamp 114 is a 100 W mercury vapour arc lamp, its initial power requirements may be 5 A at 20 V. As lamp 114 ages, its electrodes will deteriorate and the resistance it presents across terminals 110 and 112 will rise. Since output power signal $V_{out}$ is voltage regulated, the voltage may be considered constant on an instantaneous basis. As the resistance of lamp 114 rises, the current flowing through it will fall and the power drawn by lamp 114 will fall, causing signal $P_{ps}$ to fall, on an instantaneous basis. Output power control block stage 168 will respond by increasing the magnitude of power signal $V_2$, which will in turn cause DC—DC power stage 140 to increase the magnitude of output power signal $V_{out}$. This will increase the magnitude of signal $V_{ps}$ and signal $P_{ps}$. After some time, the voltage and current components of output power signal $V_{out}$ may be 4 A and 25V. The magnitude of voltage component output power signal $V_{out}$ will be progressively increased in this fashion, until signal $P_{ps}$ is restored to its initial value, or until the voltage component of power output signal $V_{out}$ can no longer be increased. This will occur if a maximum voltage or power output limit of DC—DC power stage 140 is reached. The power drawn by lamp 114 is kept constant in this way, up to a maximum voltage level.

Figure 3:
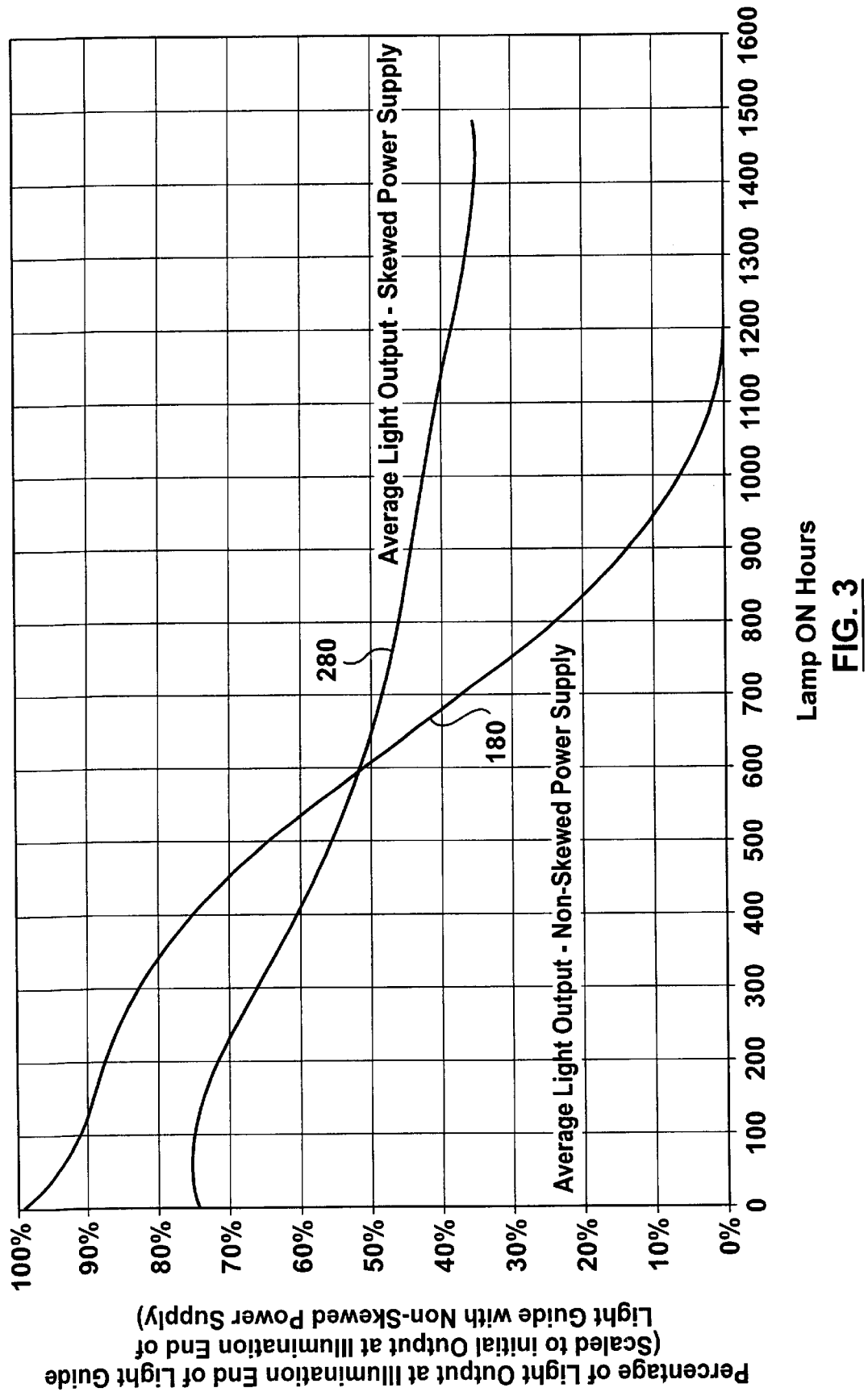
FIG. 3 is a graph illustrating the operation of the prior art power supply of FIG. 2 and of the power supply of FIG. 4, below.

Reference is next made to FIG. 3. As the electrodes of lamp 114 deteriorate, the size of the spot 133 (FIG. 1) of light reflected on diaphragm 116 will increase, as described above, despite the fact that lamp 114 draws a relatively constant amount of power from power supply 108 and emits a relatively constant amount of light. Data line 180 indicates the average light output level 180 at the illumination end 122 (FIG. 1) of the light delivery device 120 of illumination system 100 using prior art power supply 108, as shown in FIG. 1. The lamps used to obtain the data for line 180 were of a group of 100W mercury arc lamps supplied with 100W of power by power supply 20. FIG. 3 was produced from experimental data using several such lamps. The particular lamps used for the experiment were rated for a typical service life of 1000 hours. The initial light output level of the illumination end 122 of the light delivery device 120 is rated as 100%. Over time, the light output level falls and after approximately 620 hours the light output had fallen to about 50% of its initial level. After less than 900 hours, the light output level had fallen well below 20% of its initial level.

Figure 4:
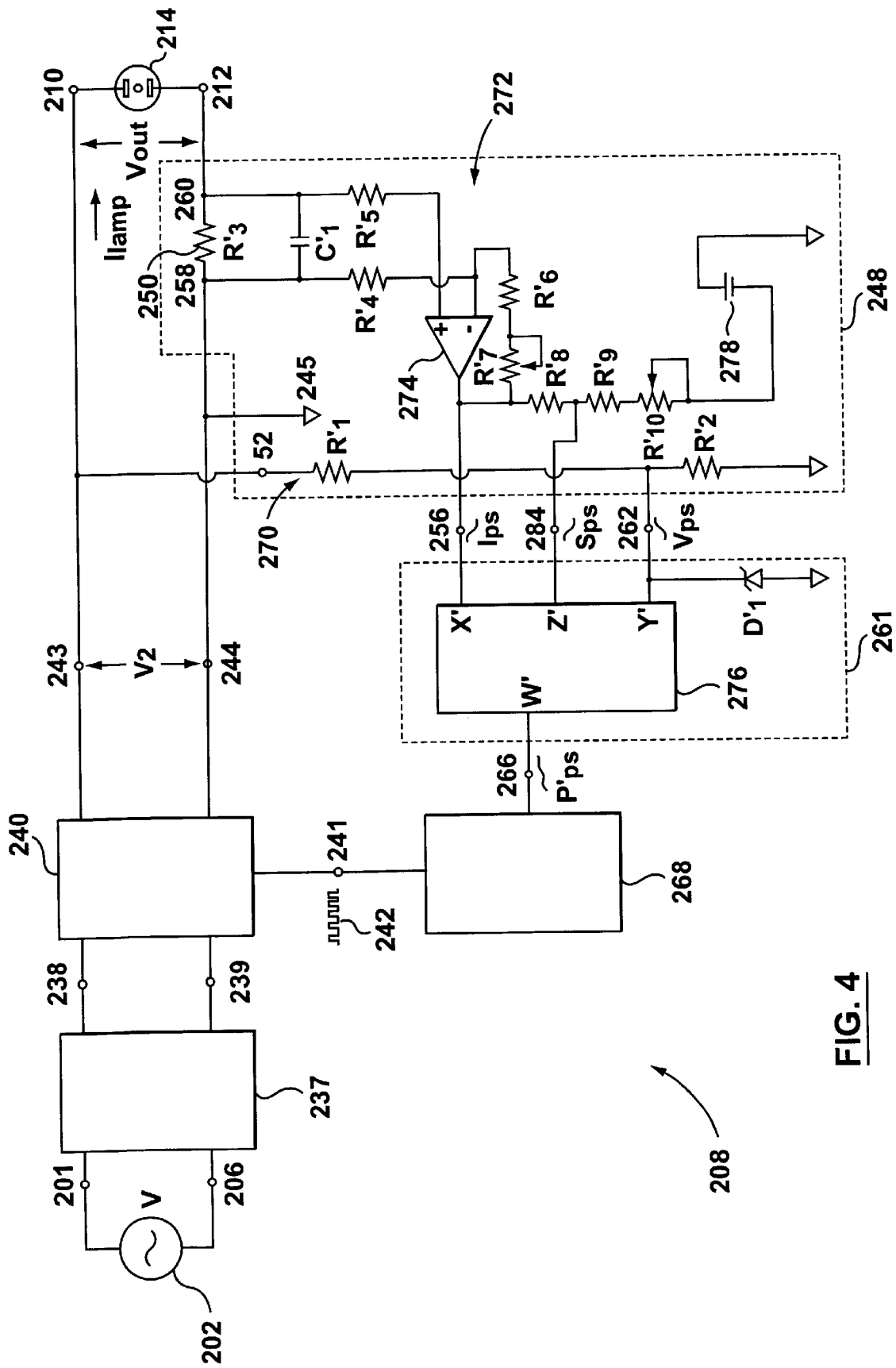
FIG. 4 is a block diagram of a power supply according to the present invention.

Reference is next made to FIG. 4, which illustrates a power supply 208 according to the present invention. Components of power supply 208 which correspond to components of prior art power supply 108 are identified by similar reference numerals increased by 100 or by adding a prime symbol (') to them. The structure and operation of off-line power stage 237, DC—DC power stage 240 and output power control stage 268 are identical to the operation of the corresponding components in prior art power supply 108.

Output power monitoring stage 248 has a voltage monitoring circuit 270 which is identical to voltage monitoring circuit 170 and which is coupled to terminal 262, where it provides signal $V'_{ps}$, which corresponds to the magnitude of the voltage component of output power signal $V'_{out}$. Output power monitoring circuit 248 also has a current monitoring circuit 272, which is coupled terminals 244 and 212. Current monitoring circuit 248 produces a signal $I_{ps}$ which corresponds to the magnitude of the current component of output power signal $V_{out}$, (i.e. the current $I'_{lamp}$ flowing through lamp 214) at terminal 256.

Current monitoring circuit 272 also comprises resistors $R_8$, $R_9$ and $R_{10}$ and a voltage source 278. Resistor $R_{10}$ is an adjustable resistor and may be used to adjust the magnitude of the skewing signal $S_{ps}$ relative to signal $I_{ps}$. Resistors $R_8$, $R_9$ and $R_{10}$ are coupled in series between terminal 256 and voltage source 278. In a preferred embodiment of power supply 208, voltage source 278 supplies a constant negative bias voltage $V_{278}$ of –5V. Resistors $R_8$, $R_9$ and $R_{10}$ form a voltage divider and voltage source 278 forms a level shifter. This voltage divider and shifter provides a skewing signal $S_{ps}$ at the node between $R_8$ and $R_9$, which is coupled to terminal 284. Skewing signal $S_{ps}$ has a magnitude equal to:

$$S_{ps} = (R_9 + R_{10})\left(\frac{I_{ps} - V_{278}}{R_8 + R_9 + R_{10}}\right).$$

Typically, $R_8$, $R_9$, $R_{10}$ and $V_{278}$ will be selected so that skewing signal $S_{ps}$ has a magnitude that is smaller than $I_{ps}$, but which has a larger proportional rate of change. Signals $I_{ps}$ and $S_{ps}$ have the same sign at all times.

Output power calculating stage 264 comprises a multiplier/summer 276 and a zener diode $D'_1$. Multiplier/summer 276 has X' and Y' inputs similar to the X and Y inputs of multiplier 176. Multiplier/summer 276 also has an additional input Z, and the output W' is calculated as follows:

$$W' = \frac{X' \times Y'}{10} + Z.$$

The Z input of output power calculating stage 264 is coupled to terminal 284 to receive skewing signal $S'_{ps}$. Multiplier/summer 276 produces a signal $P'_{ps}$ at terminal 266 as follows:

$$P'_{ps} = \frac{V'_{ps} \times I'_{ps}}{10} + S_{ps}.$$

Signal $P'_{ps}$ is not proportional to the power drawn by lamp 214 from power supply 220, but is "skewed" by skewing signal $S_{ps}$. As the current $I'_{lamp}$ through lamp 214 falls, the magnitude of signal $I'_{ps}$ will fall. This in turn will cause the magnitude of signal $S_{ps}$ to fall, however, the rate of change in skewing signal $S_{ps}$ will be larger than the rate of change in signal $I_{ps}$ (based on the resistances of resistors $R_8$, $R_9$ and $R_{10}$ and the magnitude of negative bias voltage supply 278). As lamp 214 ages and draws less current $I'_{lamp}$ from power supply 220, the effect of signal $S_{ps}$ will be to increase the rate at which signal $P'_{ps}$ falls compared to the rate at which signal $P_{ps}$ of power supply 108 falls. (A person skilled in the art will understand that signal $P'_{ps}$ does not actually fall in magnitude over time, due to the feedback control affected by output power control block 268. However, on an instantaneous basis, the magnitude of signal $P'_{ps}$ may be considered to have fallen in response to the decrease in current $I'_{lamp}$ drawn by lamp 214.)

Output power control stage 268 is coupled to terminal 266 to receive signal $P'_{ps}$ and provides a PWM output control signal 242 at a terminal 241. Output power control block 268 operates in the same way as output power control stage 168 to maintain signal $P'_{ps}$ at a constant level. Since signal $P'_{ps}$ will fall faster than signal $P_{ps}$ of power supply 108 (on an instantaneous basis), it will appear to output power control block 268 that the power drawn by lamp 214 has decreased by a larger amount than it has actually decreased by. In response, output power control stage 268 will vary PWM output control signal 242 to increase the magnitude of the voltage component of PWM output control signal 242 so that the power delivered to lamp 214 actually increases rather than remaining constant, as it did in prior art power supply 108.

In a preferred embodiment of power supply 208, the components of output power monitoring stage 248 and output power calculating stage 264 have the following values:

| Component | Value |
| --- | --- |
| $R'_1$ | 13.3 kΩ |
| $R'_2$ | 2 kΩ |
| $R'_3$ | 0.01 Ω |
| $R'_4$ | 240 Ω |
| $R'_5$ | 300 Ω |
| $R'_6$ | 20 kΩ |
| $R'_7$ | Potentiometer 10 kΩ |
| $R'_8$ | 12 kΩ |
| $R'_9$ | 18 kΩ |
| $R'_{10}$ | Potentiometer 5 kΩ |
| $C'_1$ | 100 nF |
| $D'_1$ | 12 V, 500 mW Zener |

Power supply 208 is preferably used as follows. Output power control block 268 is configured to regulate $P'_{ps}$ such that magnitude of output power signal $V'_{out}$ (in Watts) is lower than the rated power level of lamp 214, when lamp 214 is new. Typically, the initial power level of output power signal $V'_{out}$ (which is equal to $V'_{out}$ multiplied by $I_{lamp}$) will be between approximately 50% and approximately 90% of the rated power for lamp 214. For example, if lamp 214 is a 100 W lamp, then output power control block 268 may be configured to initially set output control signal 242 so that the power magnitude of output power signal $V'_{out}$ is between about 50 to about 90 W.

Figure 5:
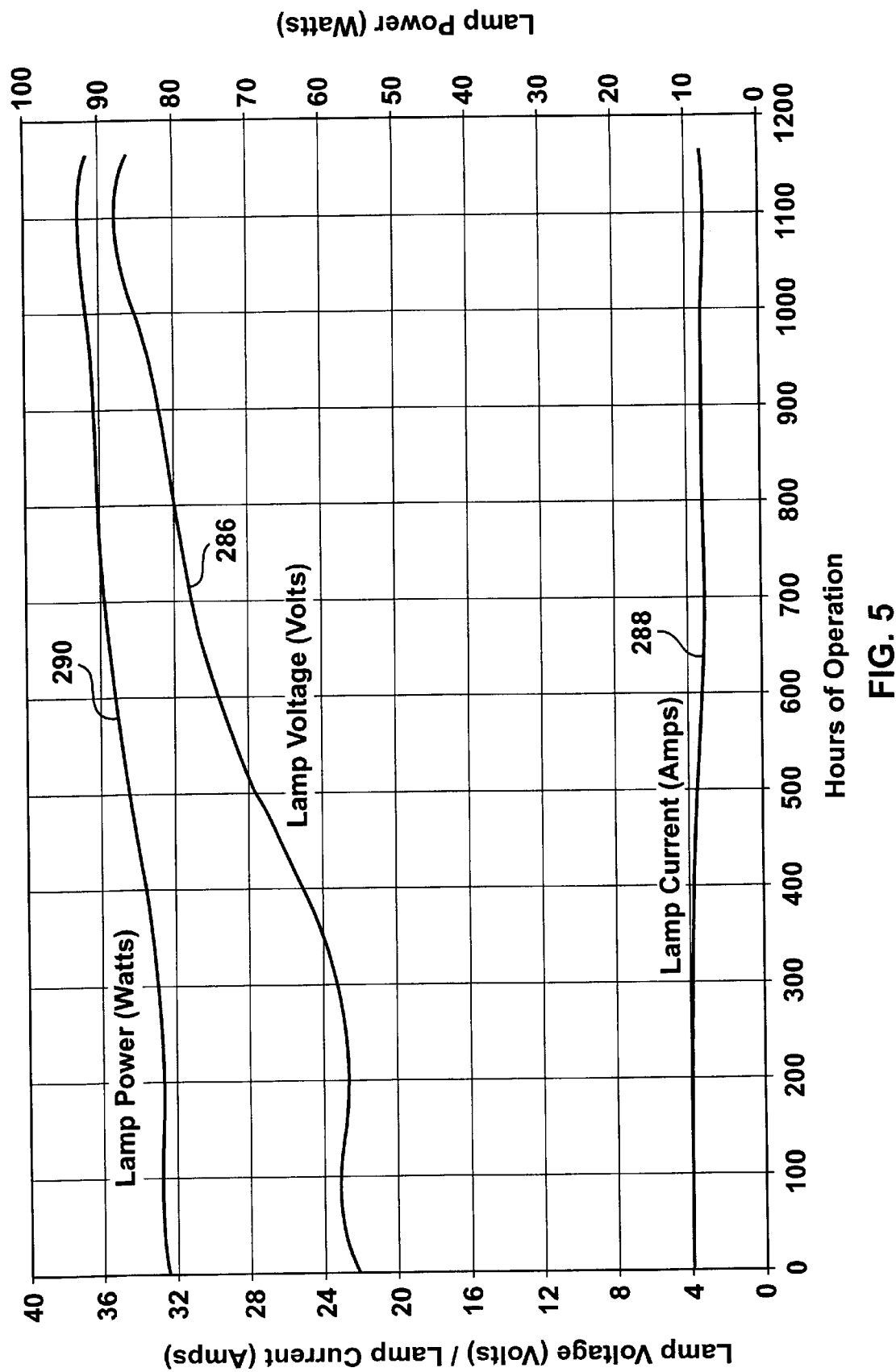
FIG. 5 is a graph illustrating voltage, current and power components of an exemplary output power signal of the power supply of FIG. 4.

Reference is next made to FIG. 5. In the preferred embodiment of power supply 208, output power control block 268 has been configured such that output voltage signal $V'_{out}$ has an initial magnitude of 80 W. Lamp 214 is selected to have a rated power of 100 W. FIG. 5 illustrates the voltage and current components and power magnitude (Lamp Power) of output power signal $V'_{out}$ during one experiment conducted using the preferred embodiment of power supply 208. The voltage component is shown as data line 286. The current component is shown as data line 288. The power magnitude is shown as line 290. As the electrodes of lamp 214 deteriorate over its useful life, the current drawn by lamp 214 falls as shown in line 288. In response, signal $P'_{ps}$ (not shown in FIG. 5) falls (on an instantaneous basis) in a skewed manner due to the addition of skewing signal in the calculation of signal $P'_{ps}$. Output power control stage 268 regulates the signal $P'_{ps}$ to keep it constant by varying output power control signal 242 to increase the voltage component (line 286) of output power signal $V'_{out}$. Due to the skewing of signal $P'_{ps}$, the increase in the voltage component of output power signal $V'_{out}$ is sufficient to increase the power magnitude (line 290) of output power signal $V_{out}$. The power supplied to (or drawn by) lamp 214 is thus increased as the current drawn by lamp 214 decreases.

By applying an initial power output signal $V'_{out}$ with a power magnitude less than the rated power of lamp 214, power supply 208 reduces the rate at which the electrodes of lamp 214 deteriorate. Thus, the effects of electrode deterioration are slowed.

Referring still to FIG. 5, the voltage component of the output power signal $V_{out}$ appears to fall between about 85 hours and 200 hours of operation of lamp 214. Since the voltage component of output power signal $V'_{out}$ is regulated by output power control stage 268 to maintain signal $P'_{ps}$ constant, an increase in signal $P'_{ps}$ will cause the voltage component to fall. This may occur when the resistance of lamp 214 between terminals 210 and 212 rises and thereby causes lamp 214 to draw more current from power supply 208. During such periods, the power applied to lamp 214 will fall. In general, however, the power magnitude of output power signal $V'_{out}$ will steadily increase. Power supply 208 is responsive in this way to the actual performance of a particular lamp 214 as the lamp 214 ages.

Reference is again made to FIG. 3. Line 280 indicates the average light output from the light delivery device 120 of an illumination system 100, when power supply 208 is used in the place of power supply 108. A series of 100 W mercury test lamps similar to those used to calculate line 180 were used to obtain the data for line 280. Since the power applied to lamp 214 during its service life is increased, then on a momentary basis, the actual amount of light produced by the lamp is increased. Although electrode degradation still results in the size of spot 133 increasing in size, the resulting decrease in the amount of light emitted from the illumination end 122 of the light delivery device 120 is reduced, since a greater quantity of light energy will be coupled in the light delivery device 120, than if the light energy output of the lamp was constant. As a result, the light output at the illumination end 122 of light delivery device 120 (line 280) falls more slowly than the lamp 114 powered by prior art power supply 108 (line 280).

Applying a lower initial power to lamp 214 with power supply 208 resulted in an initial reduction in the light output of at the illumination end 122 compared to when power supply 108 was used. In the present example, power supply 208 was configured to provide 80 W of power to lamp 214 initially. The initial light output with power supply 208 fell to approximately 75% that of the initial light output when power supply 108 was used. However, the slower reduction in the light output at the illumination end with power supply 208 (line 280) than in the case of prior art power supply 108 had the following results:

1. After about 130 hours of operation, the light output at the illumination ends 122 was within 15% of the light output of lamp 114.

2. After about 600 hours of operation, the light output at the illumination end 122 using power supply 208 exceeded that using power supply 108.

3. Lamp 114 generally failed or had a light output below 20% of its initial power after about 900 hours of operation with power supply 108, despite the fact that the lamp was rated for 1000 hours of service. In contrast, lamp 214 had a light output of more than 35% of the initial light output of lamp 114, even after 1400 hours of operation with power supply 208.

The specific performance characteristics illustrated in FIGS. 2 and 4 and stated above are only exemplary.

As noted earlier, the initial power of output voltage signal $V'_{out}$ is preferably between 50% and 90% of the rated power of lamp 214. Although an initial power level less than 50% of the rated power of lamp 214 (i.e. 50 W) may be used, this may result in an undesirably low light output level from lamp 214 and at the illumination end 122 of light delivery device 120. The inventors have found that a reasonable balance between: (i) a reduced initial light output from lamp 214 due to the reduction in the input power level; (ii) the benefit of increased light output later in the life of lamp 214; and (iii) the increase in the service life of lamp 214 is found when the initial power level applied to lamp 214 is between 70% and 85% of the lamp's rated power. The inventor has found that when power supply 208 initially provides 80% of a mercury arc lamp's rate power to the lamp, the lamp produces about 75% of the light energy it produced with power input of 100% of its rated power.

A preferred embodiment of the present invention has been described. Furthermore, the invention has been described for use with an arc lamp which exhibit electrode deterioration in response to a power signal. The present power supply is suitable for use with any lamp or related device which exhibits a degradation in its performance in response to the magnitude of the voltage component of the power signal applied to it.

Other variations of the present invention will be apparent to a person skilled in the art. All such variations fall within the spirit and scope of the present invention, which is limited only by the following claims.

I claim:

1. A method of supplying an output power signal to a load, said method comprising the steps of
    (a) determining a voltage signal corresponding to a voltage component of said output power signal;
    (b) determining a current signal corresponding to a current component of said output power signal;
    (c) determining a skewing signal corresponding said current signal;
    (d) producing a power supply control signal corresponding to said voltage signal, said current signal and said skewing signal;
    (e) modifying said output power signal in response to said power supply control signal by the magnitude of said output power signal.

2. The method of claim 1 wherein said load is a lamp.

3. The method of claim 2, wherein said lamp is rated for use at a rated power level and wherein the voltage component and current component of said output power signal are initially selected such that output power signal is smaller in magnitude than said rated power level.

4. The method of claim 1 wherein the magnitude of said output power signal is increased by increasing the magnitude of said voltage component.

5. The method of claim 1 wherein said voltage signal is generated as a fraction of said voltage component.

6. The method of claim 1 wherein said current signal is generated by amplifying a potential difference across a current monitoring element, said current monitoring element being coupled in series with said load.

7. A power supply circuit for use with a lamp comprising:
    (a) a off-line power for receiving an input power signal from a main power source;
    (b) a DC—DC power stage coupled to said off-line power for delivering an output power signal to said lamp in response to an output power control signal;
    (c) an output power monitoring stage coupled to said DC—DC power stage for providing a current level signal corresponding to a current component of said output power signal and for providing a voltage level signal corresponding to voltage component of said output power signal and for generating skewing signal corresponding to said current signal;
    (d) a power calculating stage coupled to said output power monitoring stage for receiving said current signal, said voltage signal and said skewing signal and for producing said output power control signal,
    wherein said power calculating stage is configured to vary said output power control signal such that magnitude of said output power signal generally increases.

8. A method of extending the useful life of a lamp comprising:

(a) supplying an output power signal to the lamp;

(b) monitoring a voltage component of said output power signal to produce a voltage signal;

(c) monitoring a current component of said output power signal to produce a current signal;

(d) calculating a skewing signal based on said current signal; and (e) controlling said output power signal in response to said voltage signal, current signal and skewing signal.

9. The method of claim 8 wherein, in step (c), the skewing signal is calculated by dividing and biasing the current signal.

10. The method of claim 8 wherein said lamp is an arc lamp having a pair of electrodes separated by a gap and wherein the voltage and current of the output power signal correspond to said gap.

11. The method of claim 10 wherein said gap increases as the lamp is used and wherein said skewing signal is responsive to said increase in said gap.

12. The method of claim 11 wherein as said gap increases, said skewing signal decreases.

13. The method of claim 12, wherein during step (e), the power of said output power signal is increased in response to said decrease in said skewing signal.

14. The method of claim 8 wherein step (e) is performed by:

(i) calculating a power signal corresponding to the voltage signal, current signal and skewing signal;

(ii) calculating an output power control signal in response to said power signal; and (iii) varying said output power signal in response to said output power control signal.

15. The method of claim 14 wherein said output power control signal is calculated by:

(A) multiplying the voltage signal and current signal; and (B) adding the skewing signal to the result of step (i).

16. The method of claim 15 further comprising the step of:

(C) dividing the result of step (A) or of step (B) by a factor.

17. The method of claim 16 wherein the factor is 10.

18. The method of claim 14 wherein said output power signal is varied by changing the voltage component of the output power signal.

19. The method of claim 8 wherein said lamp has a rated power and wherein, in step (a), the output power signal has a power lower than the rated power.

20. The method of claim 19 wherein, in step (a), the output power signal has a power of between 50% to 90% of the rated power.

21. The method of claim 19 wherein, in step (a), the output power signal has a power of between 70% to 85% of the rated power.

22. The method of claim 19 wherein, in step (a), the output power signal has a power of about 80% of the rated power.

23. A system for powering a lamp, the system comprising:

(a) first and second power input terminals for receiving an input power signal;

(b) first and second power output terminals for providing an output power signal to a load; and (c) a power supply coupled between said power input terminals and said output power terminals for providing an output power signal to the lamp, the power supply including:

(i) a voltage monitoring circuit coupled across the power output terminals for providing a voltage signal corresponding to the voltage of the output power signal;

(ii) a current monitoring circuit coupled to at least one of said power output terminals for providing a current signal corresponding to the current of the output power signal and for providing a skewing signal corresponding to said current signal;

(iii) an output power calculating stage for calculating a power signal corresponding to the voltage signal, current signal and skewing signal (iv) an output power control stage for generating an output power control signal in response to the power signal; and (v) a DC power stage for generating the output power signal in response to the output power control signal.

24. The system of claim 23 wherein said voltage monitoring stage comprises a voltage divider.

25. The system of claim 23 wherein said current monitoring stage comprises a current sensing element coupled in series with said load and means for amplifying a voltage drop across said current sensing element and wherein said current signal is an amplified version of the voltage drop.

26. The system of claim 25 wherein said current sensing element is a resistor.

27. The system of claim 25 wherein said current monitoring stage further includes a voltage divider and bias voltage source for providing said skewing signal.

28. The system of claim 27 wherein said voltage divider includes an adjustable resistor for allowing said skewing signal to be adjusted.

29. The system of claim 26 wherein said lamp has a pair of electrodes separated by a gap and wherein said lamp produces light generally between said electrodes.

30. The system of claim 29 wherein said electrodes erode as the lamp is used, thereby increasing the size of said gap and degrading the optical coupling between the lamp and the light delivery device and wherein said skewing signal corresponds to the degradation of said optical coupling.

31. The system of claim 29 wherein said electrodes erode as the lamp is used, increasing the impedance of said lamp and decreasing the current drawn by said lamp from said power output terminals and wherein said skewing signal corresponds to the current.

32. The system of claim 31 wherein said skewing signal is divided and biased version of said current signal.

33. The system of claim 31 wherein said skewing signal and said current signal have the same sign.

* * * * *